United States Patent [19]

Intichar et al.

[11] 4,315,172
[45] Feb. 9, 1982

[54] COOLING SYSTEM FOR ROTORS OF ELECTRIC MACHINES, ESPECIALLY FOR TURBO-GENERATOR ROTORS WITH A SUPERCONDUCTIVE FIELD WINDING

[75] Inventors: Lutz Intichar, Erlangen; Erich Weghaupt, Mülheim, both of Fed. Rep. of Germany

[73] Assignee: Kraftwerk Union Aktiengesellschaft, Mülheim, Fed. Rep. of Germany

[21] Appl. No.: 102,647

[22] Filed: Dec. 12, 1979

[30] Foreign Application Priority Data

Dec. 14, 1978 [DE] Fed. Rep. of Germany ....... 2854059

[51] Int. Cl.³ .............................................. H02K 9/00
[52] U.S. Cl. ...................................... 310/53; 310/61; 310/64
[58] Field of Search .................... 310/10, 40, 53, 52, 310/54, 61, 64; 336/DIG. 1

[56] References Cited

U.S. PATENT DOCUMENTS

| | | | |
|---|---|---|---|
| 3,809,933 | 5/1974 | Sugawara | 310/52 |
| 4,060,743 | 11/1977 | Weghaupt | 310/10 |
| 4,082,267 | 4/1978 | Laskaris | 310/10 |
| 4,091,298 | 5/1978 | Gamble | 310/10 |
| 4,123,677 | 10/1978 | Laskaris | 310/64 |
| 4,176,291 | 11/1979 | Rabinowitz | 310/10 |
| 4,228,374 | 10/1980 | Elsel | 310/53 |

FOREIGN PATENT DOCUMENTS

| | | | |
|---|---|---|---|
| 552907 | 8/1974 | Switzerland | 310/52 |
| 553499 | 8/1974 | Switzerland | 310/61 |

*Primary Examiner*—R. Skudy
*Attorney, Agent, or Firm*—Herbert L. Lerner; Laurence A. Greenberg

[57] ABSTRACT

Cooling system for a rotor of an electric machine having a superconductive field winding and formed of a rotor drum with at least one outer, substantially hollow cylindrical rotor body with a co-rotating cold shield, an inner hollow rotor body fastened at given locations within the outer rotor body so as to be thermally insulated and serving as a coil-winding support, the fastening locations at the outer rotor body being cooled, and a co-rotating mixing chamber located at the inner periphery of the inner hollow rotor body and containing a phase mixture of a coolant fed thereto from the outside, the phase mixture forming, during rotation of the rotor, a radially outwardly flung liquidring and a radially inner vapor column coaxial thereto, including channels for conducting a first coolant flow with liquid coolant from the mixing chamber for cooling the field winding and a second coolant flow with at least partly vaporized coolant for cooling the fastening locations and for returning the first coolant flow, after it has traversed the field winding, back to the mixing chamber and for discharging the second coolant flow out of the electric machine.

11 Claims, 9 Drawing Figures

COOLING SYSTEM FOR ROTORS OF ELECTRIC MACHINES, ESPECIALLY FOR TURBO-GENERATOR ROTORS WITH A SUPERCONDUCTIVE FIELD WINDING

The invention relates to a cooling system for rotors of electric machines, especially for turbo-generator rotors with a superconductive field winding.

From U.S. Pat. No. 4,060,743, especially FIG. 1 thereof, a turbo-generator rotor using a superconductive field winding has become known heretofore which is formed of a rotor cylinder with at least one outer substantially hollow-cylindrical rotor body with a co-rotating cold-shield and, with an inner rotor, which is fastened therein so as to be thermally insulated, serves as the support for the winding, and the fastening points (linking points) of which at the outer body are cooled. The space surrounding the inner rotor body is evacuated and protected by means of the cold-shield from heat penetrating from the outside. Regarding the cooling system of the cold-shield, and particularly the field winding, it can be inferred that a damper winding is fed with helium through concentric channels within the shaft and through connecting tubes, and that axial cooling is used for the field winding.

Axial cooling of the exciter conductor of a superconducting field winding is also provided in the cooling system according to copending application Ser. No. 944,391, filed on or about Sept. 21, 1978, now U.S. Pat. No. 4,228,374, wherein a co-rotating mixing chamber is provided which is located at the inner periphery of an inner rotor body and contains a phase mixture of a coolant fed-in from the outside, such as a helium phase mixture, especially, which develops into an outer, flung-out liquid ring and a concentric inner vapor column when the rotor rotates, a take-off or removal of a first coolant flow with liquid coolant for cooling the field winding, and of a second coolant flow with at least partially evaporated coolant for cooling the cold-shield is provided, and the first coolant flow is conducted through the field winding and is returned to the mixing chamber, and the second coolant flow which is conducted through the cold-shield is discharged from the machine. The axial cooling of the field winding superconductors is effected in accordance with the forced circulation principle i.e. the coolant enters the cooling channels of the field winding conductors at the one end face of the field winding in the vicinity of the transverse conductors, flows through them and the actual axial conductor portions and leaves, in heated-up condition, in the region of the transverse conductors of the other end face. Such an axial forced circulation cooling system requires a relatively large pressure gradient between the entrance and the exit side of the field winding, and also increased cost for the coolant-connecting head (if the pumping effect of the rotating rotor itself is insufficient i.e. especially the sealing thereof from the outside and the refrigeration unit which, as a rule, supplies liquid helium. In addition, hot spots which might possibly develop in the winding cannot be cooled individually; constraints are applied with respect thereto by the coolant throughput of the respective longitudinal channel.

It is accordingly an object of the invention to provide a cooling system of the type mentioned at the outset hereto in such a manner that a smaller pressure gradient can be used for cooling the superconducting field winding and that, therefore, reduced cooling capacity or a simplified refrigeration unit is sufficient. In addition, such a cooling system is provided wherein the possibility of a largely individual cooling of parts of the winding conductors, or of hot spots possibly arising thereat is afforded toward which a more-or-less strong partial coolant flow is fannable or excitable in an intrinsically reliable manner.

With the foregoing and other objects in view, there is provided, in accordance with the invention, a cooling system for a rotor of an electric machine having a superconductive field winding and formed of a rotor drum with at least one outer, substantially hollow cylindrical rotor body with a co-rotating cold shield, an inner hollow rotor body fastened at given locations within the outer rotor body so as to be thermally insulated and serving as a coil-winding support, the fastening locations at the outer rotor body being cooled, and a co-rotating mixing chamber located at the inner periphery of the inner hollow rotor body and containing a phase mixture of a coolant fed thereto from the outside, the phase mixture forming, during rotation of the rotor, a radially outwardly flung liquid-ring and a radially inner vapor column coaxial thereto, comprising means for conducting a first coolant flow with liquid coolant from the mixing chamber for cooling the field winding and a second coolant flow with at least partly vaporized coolant for cooling the fastening locations and for returning the first coolant flow, after it has traversed the field winding, back to the mixing chamber and for discharging the second coolant flow out of the electric machine, the means comprising a first network of axial, tangential and radial coolant channels pervading the winding support and the field winding, a second network of distributor channels disposed at the outer periphery of the field winding beyond a radially outermost coil base of the field winding and formed of substantially axially and tangentially extending distributor channels and substantially radial cooling channels extending along lateral surfaces of respective stacks of coil conductors of the field windings, the first and the second networks of channels being in communication with one another, radially extending feed channels connected, at one end thereof, to the network of channels at locations beyond the axial range of the field winding and, at the other end thereof, terminating at inlet locations to the mixing chamber at the space therein in which the liquid ring is formed, and return feed channels connected, at one end thereof, to the radial cooling channels of the field winding and terminating, at the other end thereof, in the mixing chamber at given locations which are, at most, at the same distance radially from the rotor axis as are the inlet locations to the mixing chamber.

The advantages obtainable with the invention are to be seen particularly in that all cooling channels of the field winding from the outer periphery through the network of distributor channels are completely flooded and penetrated by liquid helium when the rotor rotates, so that this filled condition would be retained without any or with substantially no circulation flow, if no dissipation heat were produced in the field winding. Actually the loss-free state of the field winding is purely theoretical; in operation, hot spots occur, which are distributed more or less uniformly over the entire field winding, due to heat radiated-in from the outside through the dampers and cold shield and through internal conductor junction points of the field winding. Through this locally produced or radiated-in heat, a multiplicity of thermal syphon cooling loops of the cooling system are fanned up i.e. the liquid helium contained in them is fanned up to form a circulation flow, the fanning-up being all the greater, the more the local heat is backed up or the larger the local hot spot. The field winding is thereby cooled in an intrinsically reliable manner; the hot spots thereof require as much coolant as happens to be necessary without a possibility that "quenching" can occur i.e. tripping over into the normal-conducting state. Because of the distributor channel network, which is disposed at the outer periphery of the field winding and covers the entire field winding, the flow resistance of the cooling system from the entrance side to the exit side is relatively low, especially since a multiplicity of radial cooling channels extend from the distributor channel network through the return channels into the mixing chamber.

In accordance with another feature of the invention, the radial feed channels of the second network are thermally insulated over the length thereof as shielding against adjacent parts of the rotor body having a different temperature.

In accordance with a further feature of the invention, the radial feed channels are constructed as double-jacketed high-vacuum tubes for thermal insulation.

In accordance with an additional feature of the invention, there are provided radially extending filling channels for filling and refilling the coolant channels and the mixing chamber with coolant, a filling tube disposed within the mixing chamber coaxially thereto and rotatable therewith and being connected to a helium coupling, the filling channels being connected by the filling tube to the second network.

In accordance with an added feature of the invention, the inner hollow rotor body serving as a coil-winding support has a tooth region, and the radial filling channels are disposed in the tooth region.

In accordance with yet another feature of the invention, the radial filling channels are distributed in axial alignment over the axial length of the inner hollow rotor body, and there is provided a widened axial channel connected through the tangential distributor channels to the remainder of the axial distributor channels.

In accordance with yet a further feature of the invention, the radial filling channels are distributed in an axially-normal alignment plane over th periphery of the rotor body, and there are provided circumferential channel sections terminating in the axial distributor channels of the second network and connecting the radial filling channels thereto.

In accordance with yet an additional feature of the invention, there are provided top insert strips disposed between and radially spacing the field winding and the second network from one another.

In accordance with yet an added feature of the invention, slot bottom channels are disposed beneath the stacks of coil conductors of the field windings and communicate with the return feed channels, and wherein first radial coolant channels of the field winding extend from the second network through the slot bottom channels and the return feed channels to the mixing chamber in a train of continuous thermal-syphon cooling loops, and second radial coolant channels, on the other hand, are connected only through radial cross-channels to the respective slot bottom channels, the second radial coolant channels forming radial cooling loops surrounding the stacks of field-winding coil conductors.

In accordance with still another feature of the invention, the first radial cooling channels form cooling branches surrounding the stacks of field-winding coil conductors.

In accordance with a concomitant feature of the invention, the return feed channels comprise radial tubes projecting through the space in the mixing chamber wherein the liquid ring is formed and terminating in a space therein in which the inner vapor column is disposed coaxially thereto.

Other features which are considered as characteristic for the invention are set forth in the appended claims.

Although the invention is illustrated and described herein as embodied in cooling system for rotor of electric machines, especially for turbo-generators with a superconductive field winding, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1, divided into left-hand and right-hand halves, namely, FIGS. 1A and 1B, respectively, is a simplified, diagrammatic axial view, partly in section, of a turbo-generator rotor with a superconductive field winding showing, especially, the lower half section of a pole plane taken along the line $Ia$—$Ia$ in the developed view of FIG. 3, and further showing the upper half section taken along the line $Ib$—$Ib$ in FIG. 4, parts unnecessary for an understanding of the invention having been omitted from FIG. 1;

FIG. 2 is an enlarged fragmentary view of FIG. 1 showing a detail thereof enclosed by a dot-dash circle II;

Figures 1A, 2:
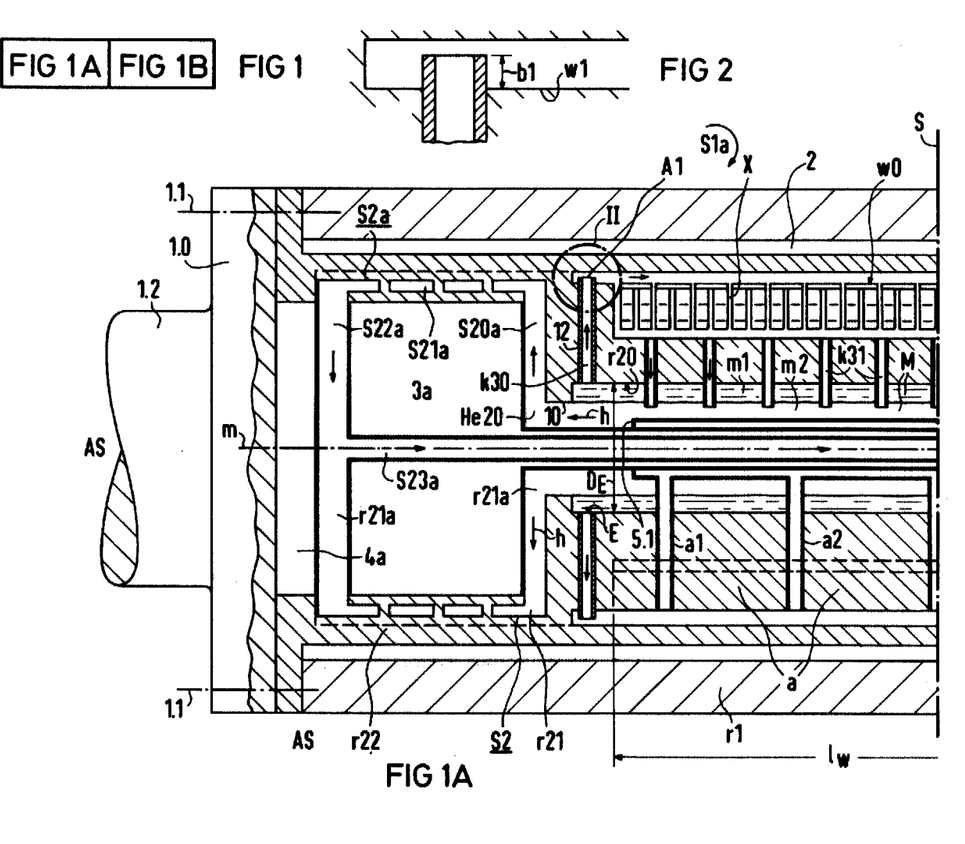
Figure 1B:
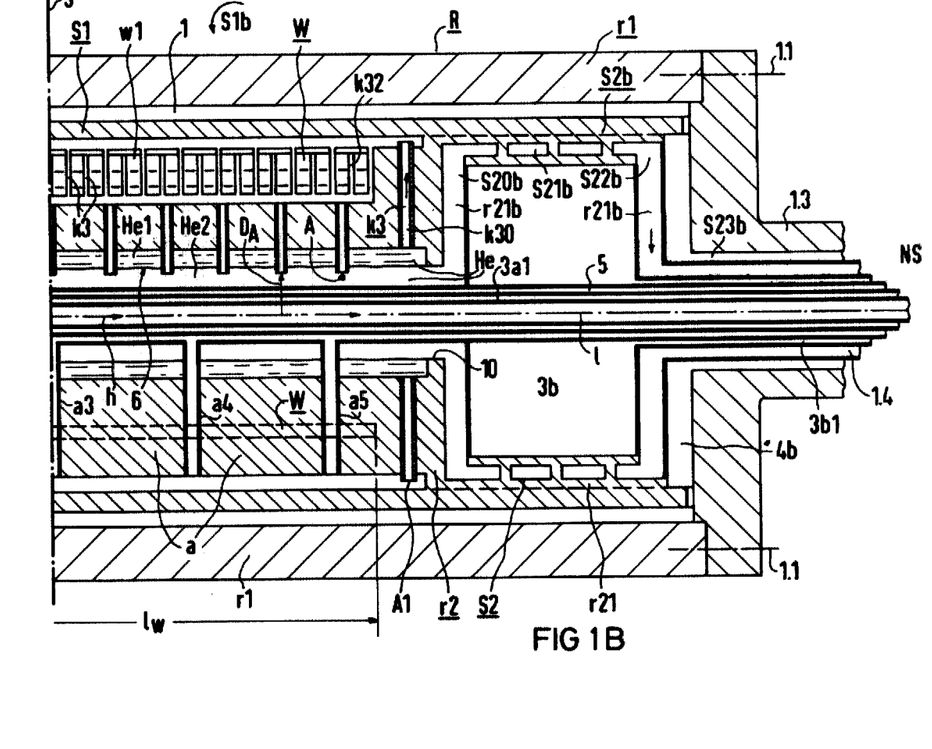

Referring now to the drawing and first, particularly, to FIG. 1 thereof made up of FIGS. 1A and 1B, there is shown therein a rotor R of a turbogenerator with a superconductive field winding W. The shape and disposition of the field winding W are merely suggested in FIGS. 1A and 1B, and are shown more clearly in FIG. 3. The rotor R is cylindrical and is formed of a hollow outer, substantially cylindrical rotor body r1 which can also have an otherwise non-illustrated outer damping cylinder. The rotor R is furthermore formed of an inner hollow tubular rotor body r2, fastened within the hollow rotor body r1 so as to be thermally insulated and serving as a support for the winding W. The rotor body r2 is slid into the "outer tube" of the rotor body r1 and is clamped with a flange 1.0 to the outer body r1 by means of flange bolts 1.1. A shaft 1.2 which is part of the "inner tube" r2, or is flanged thereto, serves at the left-hand rotor end AS for forming a non-illustrated bearing common to the rotor parts r1 and r2 whereas, at the right-hand shaft end NS a respective shaft 1.3, 1.4 concentric or coaxial to one another, is provided for the "outer tube" r2 with a respective non-illustrated bearing such as is described in detail, for example, in Swiss Pat. No. 552,907. A vacuum ring-space 1 is located between the two rotor bodies r1 and r2. Flange bolts 1.1 connect the parts 1.3 and r1.

A co-rotating mixing chamber M which contains a phase mixture He of the low-temperature liquid helium fed-in from the outside is located at the inner periphery r20 of the inner rotor body r2; an outer ring He1 of liquid which flung against the inner periphery r20 of the inner rotor body r2, and a concentric inner helium vapor column He2 being formed during rotation of the rotor R. From the mixing chamber M, a first coolant flow He10 with liquid coolant is withdrawn for cooling the field winding W, and a second coolant flow He20 with at least partially vaporized helium is withdrawn therefrom for supplying the cooling spirals r21 at the two ends of the winding support and the inner rotor part r2, respectively. The cooling spirals r21a and r21b, respectively, surround vacuum chambers 3a and 3b formed in the inner rotor body r2. In detail, the second coolant flow He20 is conducted through a coolant loop S2a on the drive side AS, and through a coolant loop S2b on the opposite side NS. The coolant loop S2a is formed of radial inflow branches S20a, spiral parts S21a, radial return branches S22a, and a central return channel S23a, which, over part of the length thereof, axially passes through the vacuum space 3a. The coolant loop S2b on the side NS opposite the drive, which is traversed by the second coolant flow He20, is similarly formed of radial inflow branches S20b, spiral parts S21b, radial return branches S22b and a shaft channel S23b, which extends coaxially to the central return channel S23a.

The second coolant flow He20, therefore, flows in the form of two loops S2a and S2b, the medium flowing therethrough in parallel and in opposite directions. The two loops S2a and S2b are identified as a whole as the outer loops S2 and serve for cooling the winding support fastening 1.0, 1.1. For axially shielding the two outer loops S2a and S2b from the outside, further vacuum chambers 4a and 4b are disposed axially in front thereof. The inner cooling loop which is supplied by the first coolant flow He10 and serves for cooling the field winding W, is identified as a whole by the reference character S1. A vacuum channel 3a1, coaxially surrounding the central return channel S23a and extending from the vacuum chamber 3a shields the channel space S23a containing warmed-up helium from an in-flow channel 5, in turn disposed coaxially to the channel space 3a1 and containing freshly re-cooled helium which is delivered into the in-flow channel 5 through the inlet chamber of a non-illustrated helium-connecting head and to the latter from a non-illustrated refrigeration machine. Parallel to the return channel S23a of the outer loop S2a, the helium which is warmed up within the outer loop S2b in the cold shield is pumped through the coaxial shaft channel 23b to the outlet chamber of the helium connecting head for the purpose of discharge from the machine, and the helium is pumped out of the outlet chamber and returned to the refrigeration unit. The helium connecting head of the rotor R is not shown in the interest of simplicity since it is not necessary for an understanding of the invention. The flow direction of the helium within the corresponding channels of the rotor R is generally indicated by the arrows h, regardless of whether the helium is in the liquid phase (indicated by dots) or in the gaseous phase (indicated by dashes). A coaxial vacuum space 3b1, which is connected to the vacuum chamber 3b, shields the liquid helium in-flow channel 5 from the shaft channel S23b again being shielded from the outside by the vacuum chamber 4b.

Figure 3:
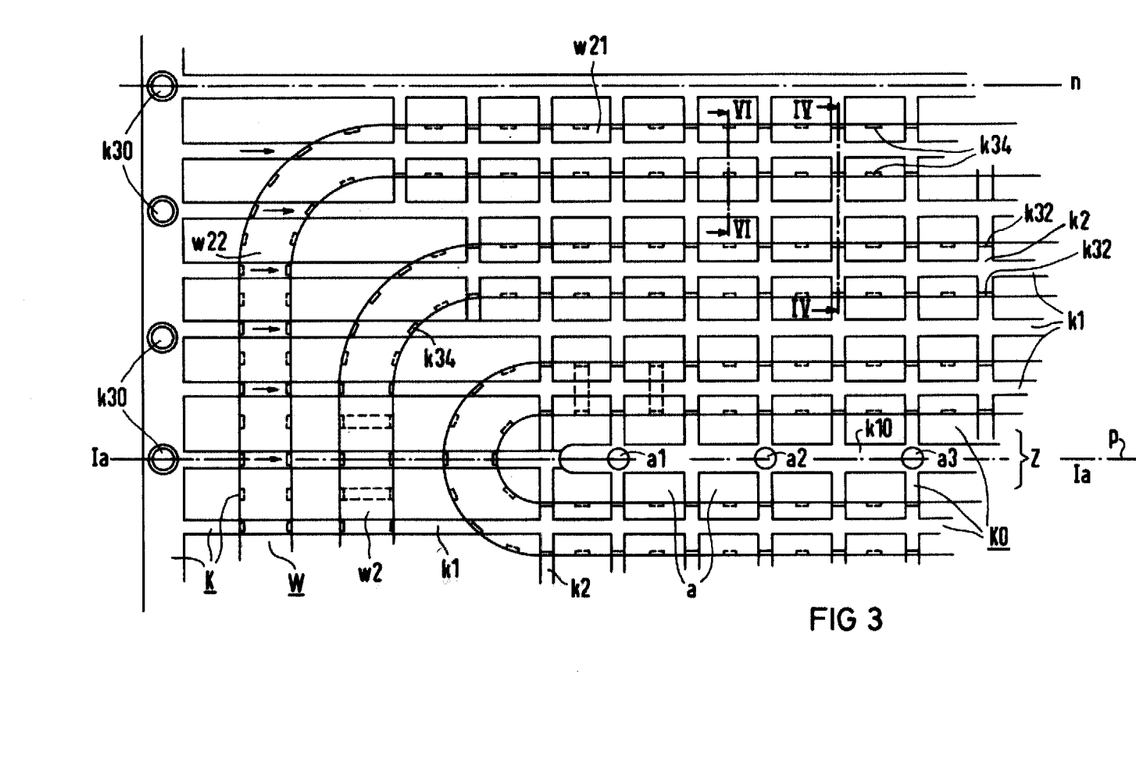
FIG. 3 is a fragmentary developed view of a distributor channel network located at the outer circumference of the field winding with the contours of the field winding indicated.
Figure 4:
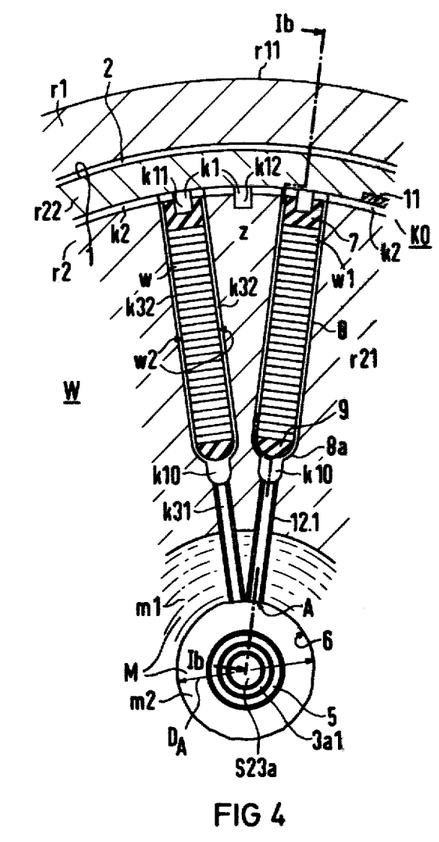
FIG. 4 is an enlarged fragmentary sectional view of FIG. 3 taken along the line IV—IV.

As shown in FIGS. 1A, 1B and 3, the winding supports r2 and the field winding W are provided by coolant channels K and, specifically, by axial channels K1, tangential channels k2 and radial coolant channels k3. For this purpose, there is provided at the outer periphery w0 and outside the radially outermost coil base w1 of the field winding W, a distributor channel network K0, made up of the hereinaforementioned substantially tangential distributor channels k2 (FIG. 3). Substantially radial cooling channels k32, which extend along lateral coil surfaces w2 of the winding conductor stacks w3 (see especially FIG. 4), communicate with this distributor channel network K0. The distributor channel network K0 is then in communication, outside the axial region $1_w$ of the field winding W on the drive side AS and on the side NS opposite the drive side, through radial feed channels k30 with a liquid space m1 of the mixing chamber M, a terminal or mouth region of the feed channels k30 being shown enlarged in FIG. 2 and having a spacing b1 from the radially outermost coil base w1. The radial cooling channels k32 of the field winding W, in turn, open through channels k31 into the mixing chamber M at such outlet locations A which are disposed on a smaller diameter $D_A$ than are the inlet locations E of the feed channels k30 having a corresponding diameter $D_E$. The outlet locations A of the return channels k31 are disposed preferably within the vapor space m2, the liquid ring He1 in FIGS. 1A, 1B and 4 having a surface level 6, at which helium evaporates continuously when the rotor R is in operation. For the desired thermal-syphon flow, it is particularly advantageous to place the outlet locations A not only on a diameter $D_A < D_E$ but also to let them extend sufficiently far into the liquid space m1 and even up to the liquid level 6, as shown in FIGS. 1A, 1B and 4. It is furthermore advantageous for the fanning-out of the thermal-syphon loop flow, explained in further detail hereinbelow, if the radial feed channels K30 of the distributor channel network K0 are thermally insulated for shielding them from the relatively warmer adjacent rotor body portions and are constructed especially, as shown as double-jacketed high-vacuum tubes. The same effect is obtained if the radial return channels k31 are thermally insulated over the length thereof and are constructed as double-jacketed high-vacuum tubes (see FIG. 4) in order to insulate them from relatively colder adjacent rotor body portions. It is most advantageous if the hereinafore mentioned insulating measures are taken both for the radial feed channels k30 as well as for the radial return channels k31. For filling or refilling the distributor channel network K0, the radial cooling channels k32, the return channels k31, the feed channels k30, as well as the mixing chamber M with coolant, radial filling channels a1, a2 . . . a5 are provided which extend, starting from a co-rotating, coaxial filling tube 5 situated inside the mixing chamber H, to the distributor channel network K0, and specifically to an enlarged axial channel k10 (FIG. 3). As shown in FIG. 3, the radial filling channels a1, a2, a3 . . . generally identified with an "a" are disposed in the tooth region z of the winding support r2. In particular, the radial filling channels a in the vicinity of the poles (pole axis p) are distributed over the axial length $1_w$ of the winding support, and with them, the enlarged axial channel k10 which is in communication with the other axial distributor channel network K0 through the tangential distributor channels k2. The filling channels a serve, first, to fill the system of cooling channels K with coolant over the distributor channel network K0, the flow direction for the cooling channel loops located to the left-hand and to the right-hand side of the symmetry axis S, as viewed in FIGS. 1A and 1B, being obtained according to the arrows S1a and S1b after the thermal-syphon loop flow is fanned-up, as can also be seen from the direction of the small flow arrows h. During the operation, only enough liquid helium is replenished through the filling channel a as is consumed within the outer loops S2 largely as gaseous helium. It is, furthermore, essential for the desired thermal-syphon loop flow that the radial feed channels k30 be located with the outlet openings A1 thereof radially further outside than the radially outermost coil base w1 of the field winding W, so that, therefore, the distributor channel network K0 is flooded with liquid helium during operation.

With reference to FIGS. 3 to 6, the cooling channel system of the winding W is explained hereinafter. As mentioned, all cooling channels K, i.e. the distributor channel network K0 also are filled and flooded with liquid helium through the radial filling channels a, that is a1, a2 and so forth, at the start of the operation. Distribution thereof is effected from the expanded axial channel k10 over the tangential channels k2, which, respectively, intersect the axial channels k1, so that the entire network K0 is flooded with helium, i.e., also the radial cooling channels k32 (see FIG. 4), the axial slot bottom channels k10, which are situated under the winding conductor stacks w2, the radial return channels k31 which communicate with the latter, as well as a second group of radial cooling channels k34, are filled through the slot bottom channels k10 and through radial spur channels k33 (see FIG. 6). Thus, while a thermal-syphon loop flow (see arrows S1a and S1b in FIGS. 1A and 1B as well as FIG. 3) can develop through the first radial cooling channels k32 during operation, since the loops are closed through the mixing chamber M, only a local thermal-syphon loop flow can develop, according to FIGS. 6 and 3, through the second radial cooling channels k34, the direction of that loop flow being not predetermined from the start and being able to occur, for example, counter-clockwise (left-hand coil conductor stack w2 of FIG. 6), or counter-clockwise (right-hand coil conductor stack of FIG. 6), vaporized helium or, specifically, lighter helium is transported thereby through the radial spur channels k32 into the mixing chamber M, while relatively colder helium reaches the second radial cooling channels k34 through the spur channels k33 and from the slot bottom channels k10, respectively.

It can be seen from FIG. 3 that the first radial (through) coolant channels k32 are supplied through the tangential channel portions k2 by the respective adjacent axial channels k1, whereas alternatingly with the first radial coolant channels k32, respectively, in axial intermediate spaces between the tangential channels k2, the second radial cooling channels k3 are disposed for local cooling.

FIG. 4 shows that the radial spacing between the field winding W, i.e., the radially outermost coil base w1, and the distributor channel network K0, is formed by slot head strips or top insert strips, which are disposed in the radially upper region of the slots 8 containing the coil conductor stacks w2. For securing the coil sides and the coil conductive stack w2 within the slots 8 thereof, there are in addition provided in the vicinity of the slot bottom 8a, slot bottom inserts 9 which are formed of dimensionally stable, high-quality insulating material like the slot head or top insert strips 7. To form the radial cooling channels k32 and k34, spacers, which are otherwise not shown in detail, are inserted between the coil conductor stacks w2 and the walls of the slot 8. The axial channels k1, k10 and the tangential channels k2 are incised into the outer periphery of the inner rotor part r2 (for example, by milling). To make available a sufficient channel cross section of the axial channels k1, appropriate axial channels k11 are cut into the slot head strips 7 and axial channels k12 are inserted also into the outer tooth region (FIG. 4).

All axial channels k1, k11, k12, are of such ample dimensions that the cooling-medium pressure drop produced therein across the length of the rotor is negligibly small, whereby a condition essential for the thermal-syphon loop flow is fulfilled.

Figure 5:
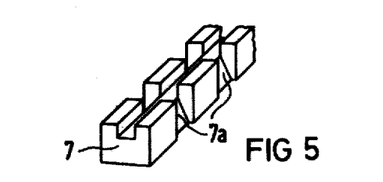
FIG. 5 is a fragmentary perspective view of FIG. 4 showing a top insert strip thereof.

So that a flow connection from the axial channels k1, k11 in vicinity of the slot head or top insert strips 7 is provided with the first radial cooling channels k32, the slot head or top insert strips 7 are formed with lateral milling cuts 7a, as shown in FIG. 5 in perspective view and, indeed, distributed over both sides and over the axial length thereof. FIG. 3 shows that the winding W with the individual coil conductor stacks w2 thereof is opened up for cooling by a multiplicity of first radial cooling channels k32, distributed over the length and the circumference thereof and by second radial cooling channels k34.

FIG. 1 shows that the mixing chamber is somewhat conically enlarged, starting from the central symmetry axis s of the rotor body r22, outwardly in direction toward the connecting points of the radial feed channels k30. The thermal-syphon loop flow is thereby also enhanced since the relatively cooler helium components position themselves radially outwardly as far as possible because of the higher specific gravity thereof and the larger centrifugal forces acting thereon. Such a conical construction of the mixing chamber is discussed in detail, for example, in U.S. Pat. No. 4,060,743 and copending application Ser. No. 944,391 filed on or about Sept. 21, 1978. The liquid level 6 remains constant during operation, since excess liquid helium flows over the edges 10, which are located at the same radius as the liquid level 6, into the outer helium loops S2a and S2b, together with the gaseous helium He20. FIG. 4 further shows, in a fragmentary view, an inner damping cylinder 11 which is located at the inner circumference of the steel cylinder r22. This inner damper 11 which is preferably formed of copper, fulfills, in addition to its function of shielding against external alternating fields, also the objective of distributing heat flowing-in from the outside through connecting points 1 as uniformly as possible over the entire outer circumference of the winding W, so that the largest possible number of thermal-syphon loops are fanned-up with helium flow.

It is evident from FIG. 3 that the winding W2 is opened up for cooling in the region of the transverse conductors W22 thereof as well as in the region of the longitudinal conductors w21 thereof by both kinds of radial cooling channels k32 and k34. The electric leads of the field winding W are not shown; a corresponding cooling system which is connected to the distributor channel network K0, would have to be provided therefor.

The operation of the cooling system according to FIGS. 1 to 6 occurs as follows:

All the cooling channels K are filled with helium, in the unenergized state of the winding W, for example, at the turning rotary speed, during which the rotor is slowly started up to the operating speed and the liquid helium is fed-in through the feed canal 5, disposed coaxially with the axis of rotation of the rotor. The channel space 5 is closed by a wall 5.1 at the end thereof; the liquid helium is, therefore, fed into the outer distributor channel network K0 through the radial filling channels a (see FIG. 1 and FIG. 3) due to the rotor pumping effect. Then, all radial channels k32, k31, k30, k33, as well as the slot bottom channel k10 also and, starting therefrom, the second radial channels k34, as well, are progressively filled radially inwardly from the outside; the flung-out ring He1 then forms and helium evaporates accordingly at the liquid level 6 to the extent to which gaseous helium He20 is drawn off through the outer cooling loops S2, and thus leads to cooling in the surface region of the flung-out liquid ring m1. In this condition, fanning-up of a thermal-syphon loop flow can result because relatively cooler helium parts accumulate in the vicinity of the inlet openings E of the radial feed channels k30 so that liquid columns in the feed tubes k30 have greater specific gravity than in the other radial cooling channels producing a pressure gradient in the direction of the inner loop S1a for the left half of the machine. This effect is aided or reinforced by the high-vacuum insulation 12 of the radial feed channels k30 as well as the high-vacuum insulation 12.1 of the return channels k31 (FIG. 4). However, the thermal-syphon loop flow is weak yet, or not yet existent, if no dissipation or waste heat is produced or introduced or radiated-in. Of course, it is then also not necessary for cooling. It is properly fanned-up only when a heat nest or hot spot occurs, for example at the point X (FIG. 1). Then, an appreciable difference in the specific gravity of the helium columns is produced in the radial feed channels k30, on the one hand, and the respective radial cooling channels k32, k31, on the other hand and, accordingly, a pressure difference which fans up the thermal-syphon loop flow and which is greater, the greater the locally produced dissipation heat which must be removed. In practice, radiation and conduction of dissipation heat will be obtained over the entire winding W, and warmer zones will be produced also locally, particularly at the non-illustrated contact points of the coil turns and in the vicinity of the field winding connecting points (not shown), so that, during operation, a continuous thermal-syphon loop flow traverses the entire cooling system and effective, intrinsically reliable cooling is thus obtained.

Figure 6:
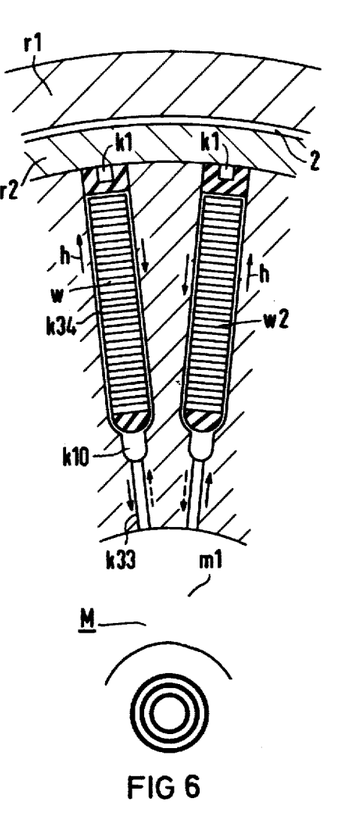
FIG. 6 is an enlarged fragmentary sectional view of FIG. 3 taken along the line VI—VI.
Figure 7:
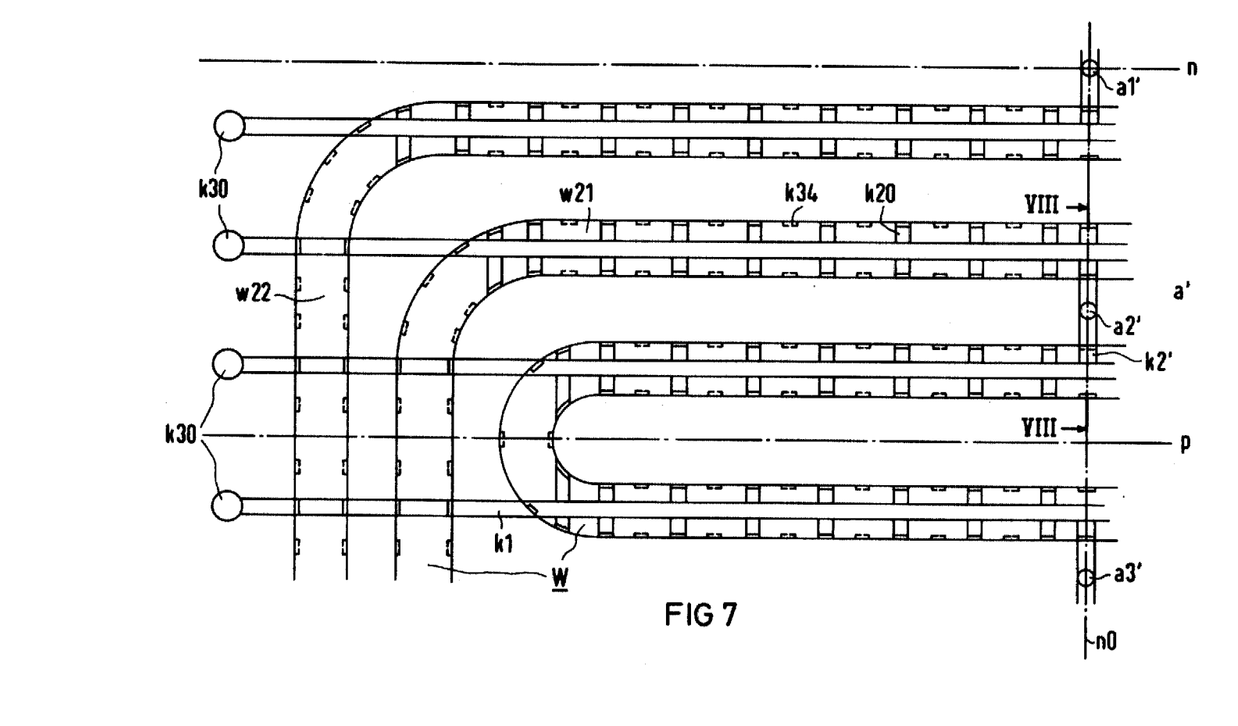
FIG. 7 is a view similar to that of FIG. 3 of another embodiment of the distributor channel network showing the location of the filling channels.
Figure 8:
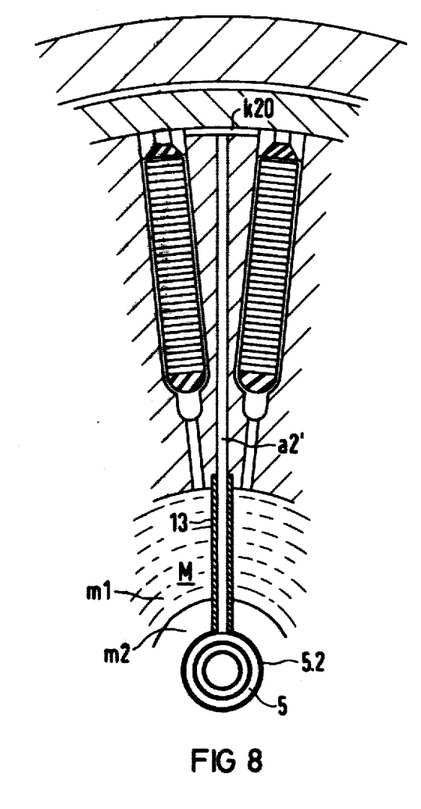
FIG. 8 is an enlarged fragmentary sectional view of FIG. 7 taken along the line VIII—VIII.

A similar operation is obtained for the cooling-system embodiment according to FIGS. 7 and 8, which differs from the first embodiment according to FIGS. 1 to 6 in that the radial filling channels a' are disposed within an alignment plane n0, which is normal to the axis and preferably situated in the center of the body, and are distributed over the circumference of the support body r2 (see the radial filling canals a1', a2', a3'). To connect the radial filling channels a' to the distributor network K0, circumferential channel sections k2 are provided which open into the axial distributor canals k1 of the distributor channel network K0. The tangential distributor channels opening up the individual radial cooling channels k32 are identified in FIG. 5 by the reference character k20. Also shown therein are the pole axis p and the neutral n. FIG. 6 shows an individual radial filling channel a2; between the channel space 5 of the feed tube 5.2 and the inner circumference of the rotor body r2, connecting tube sections 13 are distributed over the circumference and feed the liquid helium coming from the coolant-connecting head in the filing process to the outer distributor channel network K0 and penetrate the mixing chamber M, i.e. the liquid ring mo thereof and the vapor space m2 thereof. Otherwise, the construction of this system is the same as that of the first embodiment.

There are claimed:

1. Cooling system for a rotor of an electric machine having a superconductive field winding and formed of a rotor drum with at least one outer, substantially hollow cylindrical rotor body with a co-rotating cold shield, an inner hollow rotor body fastened at given locations within the outer rotor body so as to be thermally insulated and serving as a coil-winding support, the fastening locations at the outer rotor body being cooled, and a co-rotating mixing chamber located at the inner periphery of the inner hollow rotor body and containing a phase mixture of a coolant fed thereto from the outside, the phase mixture forming, during rotation of the rotor, a radially outwardly flung liquid-ring and a radially inner vapor column coaxial thereto, comprising means for conducting a first coolant flow with liquid coolant from the mixing chamber for cooling the field winding and a second coolant flow with at least partly vaporized coolant for cooling the fastening locations and for returning the first coolant flow, after it has traversed the field winding, back to the mixing chamber and for discharging the second coolant flow out of the electric machine, said means comprising (a) a network of distributor channels disposed at the outer periphery of the field winding beyond a radially outermost coil base of the field windings, (b) said distributor channel network being formed of substantially axially and tangentially extending distributor channels, (c) substantially radial cooling channels extending along lateral surfaces of respective stacks of coil conductors of the field windings and connected to said distributor channel network, (d) radially extending feed channels connected, at one end thereof, to said network of distributor channels at locations beyond the axial range of the field winding and, at the other end thereof, terminating at inlet locations to the mixing chamber at a space therein in which the liquid ring is formed, and (e) return feed channels connected, at one end thereof, to said radial cooling channels of the field winding and terminating, at the other end thereof, in the mixing chamber, (f) the terminations of said return feed channels being at locations which are, at most, at the same distance radially from the rotor axis as are said inlet locations to the mixing chamber.

2. Cooling system according to claim 1 wherein said radial feed channels are thermally insulated over the length thereof as shielding against adjacent parts of the rotor body having a different temperature.

3. Cooling system according to claim 2 wherein said radial feed channels are constructed as double-jacketed high-vacuum tubes for thermal insulation.

4. Cooling system according to claim 1 including radially extending filling channels for filling and refilling said coolant channels and the mixing chamber with coolant, a filling tube disposed within the mixing chamber coaxially thereto and rotatable therewith and being connected to a helium coupling, said filling channels being connected by said filling tube to said second network.

5. Cooling system according to claim 4 wherein the inner hollow rotor body serving as a coil-winding support has a tooth region, and said radial filling channels are disposed in said tooth region.

6. Cooling system according to claim 1 wherein said radial filling channels are distributed in axial alignment over the axial length of the inner hollow rotor body, and including a widened axial channel connected through said tangential distributor channels to the remainder of said axial distributor channels.

7. Cooling system according to claim 5 wherein said radial filling channels are distributed in an axially-normal alignment plane over the periphery of the rotor body, and including circumferential channel sections terminating in the axial distributor channels of said second network and connecting said radial filling channels thereto.

8. Cooling system according to claim 1 including top insert strips disposed between and radially spacing the field winding and said second network from one another.

9. Cooling system according to claim 1 wherein slot bottom channels are disposed beneath said stacks of coil conductors of the field windings and communicate with said return feed channels, and wherein first radial coolant channels of the field winding extend through said slot bottom channels and said return feed channels to the mixing chamber in a train of continuous thermal syphon cooling loops, and second radial coolant channels, on the other hand, are connected only through radial cross-channels to the respective slot bottom channels, said second radial coolant channels forming radial cooling loops surrounding said stacks of field-winding coil conductors.

10. Cooling system according to claim 9 wherein said first radial cooling channels form cooling branches surrounding said stacks of field-winding coil conductors.

11. Cooling system according to claim 1 wherein said return feed channels comprise radial tubes projecting through the space in the mixing chamber wherein the liquid ring is formed and terminating in a space therein in which the inner vapor column is disposed coaxially thereto.

* * * * *